United States Patent [19]

Rischen et al.

[11] Patent Number: 5,564,909
[45] Date of Patent: Oct. 15, 1996

[54] UNIT COMPRISING A DRIVE MOTOR AND A RADIAL PISTON PUMP

[75] Inventors: Dietmar Rischen, Vaihingen/Enz; Martin Huber, Oberkirch; Wilhelm Braun, Buehl, all of Germany

[73] Assignee: Robert Bosch GmbH, Stuttgart, Germany

[21] Appl. No.: 501,919

[22] Filed: Jul. 13, 1995

[30] Foreign Application Priority Data

Aug. 31, 1994 [DE] Germany .................. 44 30 909.0

[51] Int. Cl.$^6$ .................................................. F04B 1/04
[52] U.S. Cl. .................................................. 417/273
[58] Field of Search ..................... 417/410.1, 273, 417/415; 91/491

[56] References Cited

U.S. PATENT DOCUMENTS

| | | | |
|---|---|---|---|
| 2,676,608 | 4/1954 | Svenson | 417/273 |
| 4,385,870 | 5/1983 | Merz | 417/273 |
| 4,568,131 | 2/1986 | Blomberg et al. | 303/115 |
| 4,834,623 | 5/1989 | Triolo et al. | 417/410.1 |
| 4,990,065 | 2/1991 | Otaki | 417/273 |
| 4,997,344 | 3/1991 | Nelson et al. | 417/273 |
| 5,039,283 | 8/1991 | Mergenthaler et al. | 417/273 |
| 5,105,685 | 4/1992 | Yoshida | 74/606 R |
| 5,138,909 | 8/1992 | Plyter | 81/9.41 |
| 5,237,231 | 8/1993 | Blaettner et al. | 310/239 |
| 5,326,235 | 7/1994 | Bruhn | 417/410 R |
| 5,333,998 | 8/1994 | Yoshida et al. | 417/273 |
| 5,383,770 | 1/1995 | Hisahara | 417/273 |

FOREIGN PATENT DOCUMENTS

| | | | |
|---|---|---|---|
| 0509883 | 12/1993 | European Pat. Off. | |
| 56-88982 | 7/1981 | Japan | 417/410.1 |

Primary Examiner—Timothy S. Thorpe
Assistant Examiner—Peter G. Korytnyk
Attorney, Agent, or Firm—Edwin E. Griegg; Ronald E. Greigg

[57] ABSTRACT

A unit comprising a drive motor and a radial piston pump is proposed, in which unit an armature of the drive motor and an eccentric of the radial piston pup are carried by a common unitary shaft which has three bearings. A three-bearing mounting, known from the prior art, for a shaft of this kind consists of three ball bearings, which are expensive. The invention proposes to replace the ball bearing situated at the greatest distance from the eccentric in the prior art by a slide bearing, and to design the latter as a sintered metal bearing and to impregnate it with a viscous lubricant. The unit according to the invention can be used as a component of an anti-lock device of a vehicle brake installation or of a drive-slip control device acting on driven wheels.

7 Claims, 1 Drawing Sheet

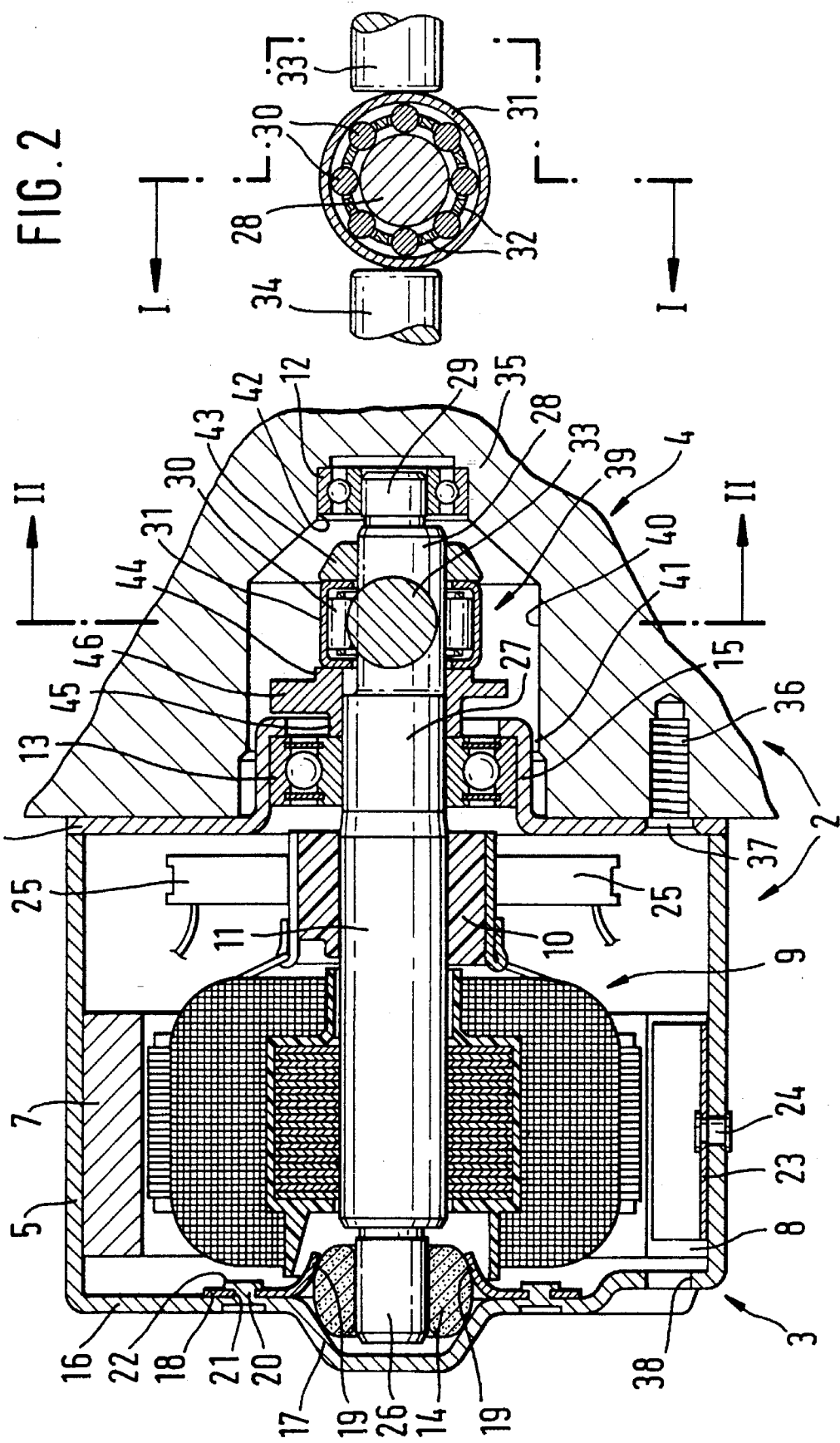

UNIT COMPRISING A DRIVE MOTOR AND A RADIAL PISTON PUMP

BACKGROUND OF THE INVENTION

1. Field of the Invention

The invention relates to a unit comprising an electric drive motor and a radial piston pump.

2. Description of the Prior Art

U.S. Pat. No. 5,105,685 a unit of this kind is disclosed which has an electric drive motor and a radial piston pump, and in which a shaft, carrying an armature together with a commutator of the drive motor and merging at one free end into an eccentric for driving at least one pump piston, is mounted by means of two ball bearings, which are arranged one on each side of the combination comprising the commutator and the armature. The commutator in this arrangement is situated closer to the eccentric than the armature. A brush-holder for the commutator is fastened to a component receiving the ball bearing situated between the commutator and the eccentric. A disadvantage in this embodiment is the relatively great distance between this ball bearing and the eccentric projecting freely from the shaft, because this relatively great distance gives rise to a heavy bending load both on the eccentric and on the shaft. As-a reaction to this high bending load, the shaft is also subjected to a bending load in the region of the commutator, with consequential elastic deformation of the shaft and correspondingly disadvantageous radial displacements of that part of the armature which is adjacent to the commutator. The occurrence of flexural vibrations on the shaft for this reason and of troublesome noise because of unavoidable play in the two ball bearings cannot be precluded.

U.S. Pat. No. 4,568,131 another unit is disclosed which comprises an electric drive motor and a radial piston pump and has two ball bearings, wherein the commutator, the armature and the eccentric are arranged in that order between the two ball bearings. In this arrangement, a shaft stub extends from the eccentric and penetrates a short distance into one of the ball bearings. Another shaft stub adjoining the commutator penetrates into the other ball bearing. Although the one ball bearing is arranged in an advantageous manner in the immediate vicinity of the eccentric, nevertheless the distance between the two ball bearings is on the other hand relatively great and the mass of the armature is situated substantially centrally between the ball bearings, so that the disadvantage exists that considerable deflection of the shaft in the region of the armature cannot be precluded. The shaft therefore has low flexural rigidity, so that pumping operation may occur at the so-called supercritical speed with the disadvantage that on transition from an uncritical speed to the supercritical speed considerable radial displacements of the armature from a design axis assigned to it cannot be precluded. This can also lead to troublesome noise generation in the ball bearings because of unavoidable play.

In European Patent No. 0 509 883 B1 a unit is disclosed which comprises a drive motor and a radial piston pump and has a stator, an armature, a shaft carrying the armature and an eccentric, and three ball bearings for the shaft. The first ball bearing is here situated between the armature and the eccentric, the second bearing next to the eccentric in the region of one end of the shaft, and the third ball bearing at the other end of the shaft in the region of a commutator associated with the armature. The arrangement of these three ball bearings is advantageous because elastic bending of the shaft is now limited. In the region of the armature the shaft therefore has a harder spring constant and accordingly a higher natural oscillation frequency, so that the unit is preferentially operated in the subcritical range. A disadvantage is the cost of the third ball bearing.

SUMMARY AND ADVANTAGES OF THE INVENTION

The unit according to the invention, comprising a drive motor and a radial piston pump and having the characterizing features of the main claim, has the advantage of lower engineering cost is required for the third bearing and that consequently the unit is less expensive to manufacture than the prior art devices. Another advantage consists in that the viscous lubrication, customary for a slide bearing of this kind, between the shaft journal and the slide bearing bush acts as an energy-dissipating damping means and in particular avoids metallic contact, which otherwise is a source of noise.

Other embodiments present, advantages development and improvements of the unit. There is in one embodiment the advantage that the slide bearing as such is in itself slightly elastic and can be impregnated with viscous lubricant. This lubricant is also suitable for damping noise. When, during damping operation, lubricant first passes out of the pores to the shaft journal and afterwards is forced back by the shaft journal, flow resistance is produced inside the pores and in an advantageous manner has an energy-dissipating effect. Another embodiment provides the advantage of self-adjustment relative to the shaft, even if during pumping operation the shaft undergoes elastic bending. Yet another provides the advantage that the shaft is less subject to the action of forces having a bending and jarring effect and that accordingly the load on the slide bearing is reduced.

BRIEF DESCRIPTION OF THE DRAWINGS

An exemplary embodiment of the unit according to the invention, comprising a drive motor and a radial piston pump, is illustrated in the drawings and explained in greater detail below.

FIG. 1 shows a longitudinal section through the unit according to the invention and FIG. 2 shows in cross-section a detail of the unit shown in FIG. 1.

DETAILED DESCRIPTION OF THE EXEMPLARY EMBODIMENT

The unit according to the invention comprises an electric drive motor 3 and a radial piston pump 4 joined thereto.

The electric drive motor 3 has a substantially cylindrically-shaped casing 5, a motor cover 6, a stator consisting of at least two permanent magnets 7, 8, an armature 9 together with an associated commutator 10, a shaft 11 carrying the armature 9 and the commutator 10 and mounted rotatably in three bearings 12, 13 and 14. In this arrangement, the bearing 13 is designed as a ball bearing. The ball bearing 13 is carried inside a tubular extension 15 formed on the motor cover 6. In a manner essential to the invention, the bearing 14 is designed as a slide bearing. This slide bearing 14 is advantageously a sintered metal bearing, the pore spaces of which are filled with a lubricant, such as highly aging-resistant lubricating oil. A sintered metal bearing of this kind is described in the book "Konstruktionselemente der Feinmechanik" ["Design Elements of Precision Mechanics"] by Professor Dr. Ing. habil. Werner Krause, Karl Hanser Verlag Munich Vienna, ISBN 3-446-15332-2, Year 1989, Pages 362 and 363. The sintered metal bearing 14 is advantageously designed as a spherical cap bearing as illustrated on Page 362 in FIG. 8.2.9.e. For this purpose, an end wall 16 of the casing 5 has a bulge 17, which is produced by pressing or deep-drawing and into which the sintered metal bearing 14 penetrates. In order to secure the sintered metal bearing 14 in position in the bulge 17, a locking plate 18 is provided, which has spring tongues 19 pressing against the sintered metal bearing 14. The locking plate 18, is, for example, riveted to the end wall 16. This can, for example, be done in known manner by forming so-called rivet pins 20 from the material of the end wall 16, said pins passing through holes 21 provided in the locking plates 18 and being formed into rivet heads 22.

In order to secure the at least one permanent magnet 7 or 8 in the casing 5, at least one locking spring 23 is provided. This locking spring 23 is fixed relative to the casing 5 by means of a locking pin 24. At least two carbon brushes 25 are associated with the commutator. The carbon brushes 25 are guided in sheaths (not shown), which are fastened, in a manner illustrated in U.S. Pat. No. 5,105,685, for example, close to the ball bearing 13, preferably on the motor cover 6.

For the purpose of mounting in the slide bearing 14, the shaft 11 has a journal 26 projecting from the armature 9. Inside the ball bearing 13, the shaft 11 has a cylindrical portion 27. This cylindrical portion 27 is adjoined in the direction of the ball bearing 12 by an eccentric 28. As can be seen in FIG. 1, the eccentric 28 is integral with the shaft 11 and project from the cylindrical portion 27. Another journal 29 of the shaft 11 adjoins the eccentric 28. In the present example the eccentric 28 is surrounded by bearing needles 30, around which a bearing ring 31 extends. A needle cage 32 ensures adequate parallel alignment of the bearing needles 30 in relation to the eccentric 28. Two pump pistons 33 and 34 are displaceable by means of the eccentric 28, with the interposition of the bearing needles 30 and the bearing ring 31. For the direct or indirect displaceable reception of the pump pistons 33 and 34, a pump casing 35 is provided. This pump casing 35 is joined to the motor cover 6 and for this purpose has at least one threaded bore 36. An aperture 37 in the motor cover 6 and an aperture 38 in the casing 5 are associated with said threaded bore 36. A screw (not shown) can be passed through the holes 37 and 38 and thereby the electric drive motor 3 and the radial piston pump 4 can be clamped together to form the unit 2. To enable the eccentric 28 to move inside the pump casing 35, the casing 35 has an eccentric chamber 39. The eccentric chamber 39 is bounded by a stepped bore 40 provided for this purpose. In this arrangement the stepped bore 40 is designed such that a radial distance 41 remains between it and the tubular extension 15. Adjoining the stepped bore 40 is a bore 42 into which the ball bearing 12 is inserted. It is here possible for the ball bearing 12 to be seated fast in this bore 42 and for the journal 29 to be displaceable relative to the ball bearing, or vice versa.

The bearing needles 30 and the bearing ring 31 are secured in axial alignment relative to the eccentric 28 by means of a stop ring 43, which is pressed onto the eccentric 28, and by means of another stop ring 44 which merges into a hub 45. By means of the hub 43, the stop ring is fastened on the cylindrical portion 27 of the shaft. Since in accordance with FIG. 1 the eccentric 28, the bearing needles 30 and the bearing ring 31 recognizably form an unbalanced mass, a counterweight 46 is formed on the hub 45. In this case the counterweight 46 can have dimensions such that the masses of the pump pistons 33 and 34 can also be at least partly balanced.

The electric drive motor 3 is, for example, produced in a motor factory, where during its assembly it is also immediately connected to the hub 45, the bearing needles 30 and the bearing ring 31, and also to the stop ring 43. For connection purposes the shaft 11 is introduced into the eccentric chamber 39 with the journal 29 foremost, whereupon the journal 29 is mounted by means of the ball bearing 12. In this connection, as already indicated, it is in itself immaterial whether the ball bearing 12 is introduced first and the journal 29 then inserted, or whether the journal 29 is inserted together with the ball bearing 12 into the bore 42. In any case, upon insertion of the journal 29, the electric drive motor 3 is centered relative to the pump casing 35, while as soon as the motor cover 6 is brought into abutment against the pump casing 35 the radial distance 41 is obtained.

It is additionally pointed out that the eccentric 28 need not be in one piece with the shaft 11 between the journal 29 and the cylindrical portion 27, as shown in FIG. 1. On the contrary, as shown in European Patent No. 0 509 833 B1, it is also possible to construct the eccentric in the form of an eccentric bush and to mount it over a cylindrical portion of the shaft and secure it against rotation relative to the shaft. This can, for example, be done by pressing the eccentric onto the shaft. In the case of construction in this manner, a development is then also possible in accordance with German Patent No. DE 42 41 827 A1, in which the eccentric is made of a plastic.

When the electric drive motor 3 is switched on, the armature 9 turns the shaft 11, so that the eccentric 28 and the bearing ring 31 make an eccentric rotary movement and thus act on the pump pistons 33 and 34. On each displacement of the pump pistons 33 and 34 away from the longitudinal axis of the shaft 11, pressure is generated in pump cylinders (not shown), which for example can be taken from the prior art. It is then not possible to exclude the possibility that the shaft 11 will be subject to elastic bending in the region between the cylindrical portion 41 and the journal 29, whereby, if the third bearing 14 were not provided, a disadvantageous radial displacement of the armature 9 relative to the stator, comprising the permanent magnets 7 and 8 could occur. The bearing 14 and the journal 26 of the shaft 11 substantially limit the displacement of the armature 9 in the radial direction to an extent corresponding to bearing play between the journal 26 and the slide bearing 14. Because the slide bearing 14 is designed as a sintered metal bearing and is filled with viscous lubricant, viscous lubricant is available in a bearing gap (not shown) between the sintered metal bearing 14 and the journal. This viscous lubricant avoids metallic contact between the journal 26 and the sintered material of the sintered material bearing 14, while the substantial advantage over a ball bearing is also obtained that the film of viscous lubricant, together with the journal 26 and the sintered metal bearing 14, forms a hydraulic damping means to damp vibrations of the shaft 11 which are incited during operation of the unit according to the invention, whether as the result of unbalance of the armature 9, unbalance of the eccentric, the masses of the pistons 33 and 34, or of only incomplete compensation by the counterweight 46. In contrast to a unit having three ball bearings in accordance with the prior art, the unit 2 is thus equipped with noise reduction means, which is found particularly advantageous when this unit is used for its intended purpose in a motor vehicle as a component in an anti-lock device or drive-slip control device, in accordance with the teaching of European Patent No. 0 509 883 B1 through the attachment of electromagnetically controllable valves for brake pressure variation.

The foregoing relates to preferred exemplary embodiments of the invention, it being understood that other variants and embodiments thereof are possible within the spirit and scope of the invention, the latter being defined by the appended claims.

We claim:

1. A unit comprising a drive motor and an axially aligned radial piston pump, which has a stator, an armature, an eccentric, at least one pump piston, and a unitary shaft, one end of the shaft carries the armature and another end forms the eccentric, and said shaft includes only three support bearings, a first bearing arranged between the armature and the eccentric, a second bearing outwardly of the eccentric, and a third bearing arranged outwardly of the armature, and the third bearing is designed as a slide bearing (14).

2. The unit comprising a drive motor and a radial piston pump as claimed in claim 1, in which the slide bearing (14) is designed as a sintered metal bearing.

3. The unit comprising a drive motor and a radial piston pump as claimed in claim 2, in which the slide bearing (14) is designed as a spherical cap bearing.

4. The unit comprising a drive motor and a radial piston pump as claimed in claim 2, in which a counterweight (46) rotating with the shaft (11) is associated with the eccentric (28).

5. The unit comprising a drive motor and a radial piston pump as claimed in claim 1, in which the slide bearing (14) is designed as a spherical cap bearing.

6. The unit comprising a drive motor and a radial piston pump as claimed in claim 6, in which a counterweight (46) rotating with the shaft (11) is associated with the eccentric (28).

7. The unit comprising a drive motor and a radial piston pump as claimed in claim 1, in which a counterweight (46) rotating with the shaft (11) is associated with the eccentric (28).

* * * * *